United States Patent [19]

Greenwood

[11] Patent Number: 4,637,266
[45] Date of Patent: Jan. 20, 1987

[54] PROCESS FOR SAMPLING PARTICULATE MATTER PASSING FROM ONE TREATMENT ZONE TO ANOTHER

[75] Inventor: Arthur R. Greenwood, Niles, Ill.

[73] Assignee: UOP Inc., Des Plaines, Ill.

[21] Appl. No.: 807,725

[22] Filed: Dec. 11, 1985

Related U.S. Application Data

[62] Division of Ser. No. 686,053, Dec. 24, 1984, Pat. No. 4,567,022.

[51] Int. Cl.$^4$ ................................. G01N 1/02
[52] U.S. Cl. ..................... 73/863.86; 34/10; 208/140; 422/141; 502/45
[58] Field of Search ............... 422/141–145, 422/191–193, 213, 216, 218, 223; 48/197 R, 197 FM; 34/10, 57 A; 502/34–38, 41–48; 208/134, 139, 140; 73/863.81, 863.86, 864.51, 864.63

[56] References Cited

U.S. PATENT DOCUMENTS

| | | | |
|---|---|---|---|
| 2,440,525 | 4/1948 | Roetheli | 422/144 X |
| 3,652,231 | 3/1972 | Greenwood et al. | 208/140 X |
| 3,692,496 | 9/1972 | Greenwood et al. | 208/140 X |
| 3,706,536 | 12/1972 | Greenwood et al. | 208/140 X |
| 3,786,682 | 1/1974 | Winter et al. | 73/863.86 |
| 3,838,039 | 9/1974 | Vesely et al. | 208/140 X |
| 3,882,015 | 5/1975 | Carson | 422/142 X |
| 3,907,511 | 9/1975 | Forbes et al. | 422/191 |
| 3,973,440 | 8/1976 | Vande Ven et al. | 73/863.81 |
| 4,167,474 | 9/1979 | Sikonia | 208/140 |

Primary Examiner—Richard L. Chiesa
Attorney, Agent, or Firm—Thomas K. McBride; John F. Spears, Jr.; Barry L. Clark

[57] ABSTRACT

Process for sampling particulate matter in a downwardly movable bed thereof which is successively contacted by two different process gases, the second of which is moving upwardly, in such a manner that the particulate matter sampled will be fully representative of particles which have been fully contacted by the first process gas but which have not been contacted by the upwardly moving second process gas. The particulate matter is passed downwardly in the shape of an annular bed through a first annular treatment zone while the major portion of the first process gas is passed through the annular bed in a radially inward direction. The annular bed is then passed downwardly along with a small amount of the first process gas from the first treatment zone through an elongated transition zone and into the radially outermost upper portion of a generally cylindrical second treatment zone. A second process gas is then passed upwardly through the second treatment zone while being prevented from entering the transition zone. Sampling is done in the transition zone.

9 Claims, 3 Drawing Figures

PROCESS FOR SAMPLING PARTICULATE MATTER PASSING FROM ONE TREATMENT ZONE TO ANOTHER

CROSS REFERENCE TO RELATED APPLICATION

This application is a Division of Ser. No. 686,053, filed Dec. 24, 1984 now U.S. Pat. No. 4,567,022 issued Jan. 28, 1986.

BACKGROUND OF THE INVENTION

The invention relates to a process and an apparatus of the type wherein a gas or vapor is used to react with or treat a particulate type of contact material such as a catalyst, which is passing by gravity from one reaction or treating zone to another. Examples of processes carried out in such an apparatus include various hydroprocessing techniques such as catalytic reforming, catalyst regeneration, hydrotreating, dehydrogenation of butane and dehydrocyclodimerization, to name a few. A specific example of a catalyst regeneration apparatus in which a catalyst whose surface has been covered with coke during a catalytic reforming operation, moves downward through a carbon burn-off section, through a halogenation section and into a drying section is shown and described in Greenwood et al, U.S. Pat. No. 3,652,231, the subject matter of which is herein incorporated by reference. In this particular apparatus, the catalyst moves downwardly in the annular space between a pair of spaced concentric perforated screens and is subjected initially to a first radially flowing recycle flue gas having a relatively low oxygen content and secondly, to a radially flowing second gas containing air, a halogen and steam. The first and second gases are each brought into an annular, elongated plenum space surrounding the annular screens and are segregated within the plenum by an annular baffle ring which divides the plenum into two regions. Obviously, this arrangement permits some of the recycle gas to diffuse downwardly into the catalyst region being subjected to the second gas while permitting some of the second gas to diffuse upwardly into the catalyst region being subjected to the first gas. To the extent there is diffusion, it is difficult, if not impossible, to determine if there is any particular location in the annular space in which the catalyst could be sampled so as to provide a sample which could be said to be truly representative of the catalyst after its coked surface had been burned off to a desired extent. In usual practice, although sampling devices such as those shown in U.S. Pat. Nos. 3,786,682 and 3,973,440 do exist, it is common, when attempting to measure the extent to which coke has been burned off, to operate only the burn-off zone of the regenerator without operating lower zones such as halogenation and drying. Then, after the regenerator has been operated for a sufficient number of hours to permit catalyst to pass through the inoperative halogenation and drying zones and to get to the bottom of the vessel, a sample is taken of the catalyst leaving the vessel. Such a method obviously is very time-consuming and is thus sometimes done only upon startup of operation.

SUMMARY OF THE INVENTION

It is among the objects of the present invention to provide a process and an apparatus for transferring a column of particulate contact material by gravity from one upper treatment zone where it is contacted by a first gas to another lower treatment zone where it is contacted by a second gas in such a way that a region will be defined in which the contact material can be sampled while it is truly representative of the condition of the material after complete treatment in the upper zone.

A further object is to provide a sampling process for sampling particulate matter in a downwardly movable bed thereof which is successively contacted by two different process gases, the second of which is moving upwardly, in such a manner that the particulate material sampled will be fully representative of particles which have been fully contacted by the first process gas but which have not been contacted by the upwardly moving second process gas.

Another object is to provide a transfer apparatus which assists the gravitational movement of particulate contact materials between an upper treatment zone and a lower treatment zone.

Yet another object is to provide a transfer apparatus which permits the free gravitational movement of particulate contact materials from an upper gas treatment zone to a lower one while preventing upward movement of a gas in the lower zone into the upper zone.

The foregoing and other objects and advantages are achieved by the process and the apparatus of the present invention. In a preferred embodiment, a particulate contact material, such as spherical particles of a catalyst, may be transferred in a generally continuous manner from one treatment zone to another. In a specific application wherein the apparatus of the invention comprises the burn-off and chlorination zones of a catalyst regenerator, the catalyst particles are transferred to the apparatus from a reactor where, during the course of reacting with a hydrocarbon stream, they have become at least partially coated with coke. The transfer of particles to the upper treatment zone of the instant apparatus may be by means of a lift engager, or other suitable transfer means, which forms no part of the present invention. Similarly, the particular apparatus used to transfer the particles from the lower treatment zone of the instant apparatus to other treatment zones and/or back to the reactor, forms no part of the present invention.

The first or upper treatment zone of the instant apparatus includes a pair of vertically elongated, radially spaced perforated members, such as screens which have been made by helically wrapping and welding wedge-shaped wires around a plurality of support rods. Preferably, as discussed in U.S. Pat. No. 3,652,231, the screen is cut and rerolled at a 90° angle to its original position to cause the wires to run parallel to the vertical flow path of the catalyst particles. Such a positioning minimizes attrition of the bed of catalyst particles moving downwardly in the annular space between the members, and also reduces the chance that the pressure of the radially flowing treatment gas will cause any particles to get pinned in the vertical flow slots defined by the wires where they could possibly produce an increase in back pressure and where they could possibly cause a maldistribution of the gases. The apparatus includes an annular plenum space or region around the aforementioned pair of spaced screens into which a first treatment gas, such as recycle flue gas into which a controlled quantity of air has been added, is introduced. The air addition is controlled so that the recycle flue gas will have a relatively low oxygen content, such as 0.8%. By providing a relatively lengthy residence time of the catalyst particles with the gas and by providing constant recirculation of large volumes of the gas through the screens and catalyst particles, the coke on the particles will be gradually burned off so as to reduce the weight percent of carbon on the particles from about 5% to about 0.2%. The treatment gas, together with the products of combustion, will pass into a central vapor collection zone located radially inwardly of the screens.

It is essential that the oxygen content be kept quite low in the upper zone since more oxygen would provide a faster carbon burn-off and produce a higher temperature in the catalyst bed. It is well known that elevated temperatures can cause destruction, or at least a reduction in the anticipated life of catalyst particles. However, as hereinafter discussed, it is also essential that enough oxygen be provided that sufficient coke will be burned off in the upper zone that not enough is left on the particles so as to cause them to overheat and be destroyed when they contact the higher oxygen content gas in the lower zone.

The apparatus further includes a lower cylindrical zone. The catalyst particles contained in this zone move downwardly through the zone by gravity as material is withdrawn from the bottom of the zone. A transition zone, to be hereinafter described, joins the upper and lower zones and uniformly distributes catalyst from the upper zone to the lower zone. In the radial flow upper zone, large volumes of the first gas, a recycle flue gas to which a small quantity of oxygen has been added in the form of air, must typically be recycled continuously by a blower to gradually burn off the coked surface on the catalyst. However, in the lower cylindrical zone, no substantial gas flow rates are required since it has been found that the catalyst particles can be reconditioned by merely being soaked in the second gas. The second gas is relatively rich in oxygen compared to the first gas and is preferably air to which a chlorination agent such as $Cl_2$, HCl or an organic chloride has been added. The second gas is caused to flow slowly upwardly through the lower bed and into the central vapor collection zone. The vapor collection zone is defined on its bottom by the upper surface of the catalyst particles in the lower zone and on its sides, at its lower end portion, by the radially inner surface of the inner wall of the transition zone and, at its upper end portion, by the inner perforated wall of the annular upper zone. During the soaking period in the second gas, catalyst particles, at least in the situation wherein the catalyst is Pt, have the Pt reconditioned by being redistributed uniformly over the pore surfaces of the substrate. This operation is desirable since the Pt catalyst tends to become unevenly distributed as the coke is burned off the catalyst particles in the upper zone.

The aforementioned transition zone comprises a pair of inner and outer unperforated wall members which define a vertically elongated, generally annular flow channel through which the catalyst particles leaving the annular upper zone can flow substantially uniformly into the annular outer edge portions of the generally cylindrical lower zone.

In the preferred embodiment, the walls of the transition zone are spaced apart more at the top than the bottom so that they constitute downward extensions of the cylindrical screens which define the upper zone. The inner wall of the transition zone is preferably straight for its entire length so as to present a smooth flow surface for the particles. The outer wall can also extend straight downwardly so as to provide a transition zone of constant cross-section. However, it is preferred that the outer wall be generally inwardly tapered in an intermediate region between its upper and lower ends. Thus, the transition zone will have a considerably less area in annular cross-section at its bottom than at its top. Because of the progressive reduction in the radial width of the transition zone, the volume of catalyst particles which it contains may be considerably reduced as compared to having a zone of the same height and parallel walls which extend down from the screen cylinders. More importantly, the reduction in cross-section will provide a reduction in gas flow as compared to a transition zone of the same height with parallel sides. The tapered wall also provides a good mounting location for a sampling structure.

The vertical dimension of the transition zone should be at least equal to, and preferably greater than, the distance between the screen cylinders. This dimensioning will assure that the pressure drop between the upper and lower zones will not be less than the radial pressure drop across the upper zone. By maintaining the aforementioned dimensional relationship, the major portion of the first gas will pass radially inwardly through the upper zone screens and into the central collection zone. Also, the ascending gas in the lower zone will pass vertically into the central collection zone which is of course at a pressure lower than the pressure of the first and second gases as they enter their associated zones. The second gas will not enter the transition zone since it would encounter the considerable back pressure of the catalyst bed therein as well as a small downward flow of the first gas. Rather, it will naturally pass, because of the absence of any back pressure, into the central collection zone. There is an absence of back pressure since the top layer of catalyst particles in the lower zone defines the bottom of the collection zone.

The height and/or radial width of the transition zone is preferably selected to be of such an extent that a pressure drop will be attained through the catalyst particles in the zone which will be high enough that it will prevent a downward flow of the first gas through the zone which would be sufficient to cause fluidization of the catalyst particles at the juncture of the transition zone and the lower zone. If fluidization could take place, the particles could attrite rapidly. Conversely, the transition zone height should be short enough that at least some relatively small amount of the first gas will continue to flow downwardly. The downward flow of the first gas assists the gravitational flow of catalyst particles through the transition zone. In a particular design of an apparatus a transition height equal to about three times the distance between the screens in the first zone appeared to be quite satisfactory.

From the description supra, it will be readily apparent that the catalyst particles in the transition zone are quite uniformly representative of the degree to which coke has been burned off. Thus, if the catalyst particles in the transition zone could be sampled, the sampled particles would accurately indicate the treatment level achieved in the burn-off zone. Since the sampling could be done continuously, or at least periodically, it would enable one to better control the regeneration process and minimize possible damage to the catalyst particles by overheating. For example, if sampling determines that not enough coke is being burned off, the oxygen content of the first gas could be increased. Similarly, if the burn-off was found to be sufficiently complete, the oxygen content of the burn-off gas could possibly be reduced. The ability to accurately determine the degree of burn-off is of particularly great importance when one considers that catalyst particles which might be allowed to enter the high oxygen content lower zone with a substantial amount of coke still on their surfaces could possibly react so quickly with the oxygen that they would be heated instantly to temperatures upwards of 2000° F. Such high temperatures could fuse the particles together and destroy them while somewhat lower, but still elevated, temperatures could greatly shorten their useful life. Ideally, the oxygen level in the first gas should be just sufficient to cause the catalyst particles leaving the upper burn-off zone to be sufficiently free of coke that they will not experience a damaging increase in temperature when reaching the oxygen-rich lower zone. This minimized oxygen level in the upper zone will also assure that the catalyst particles are subjected to a minimal temperature in the upper zone. Thus, the useful life of the catalyst particles can be maximized. Previously, it has been necessary to try and provide at least slightly more oxygen in the upper zone than absolutely necessary in order to be assured of a desired degree of coke burn-off. However, any excess oxygen obviously increases catalyst temperature and thus shortens the catalyst life. The ability to achieve even a small decrease in catalyst temperature, especially in the upper zone where the catalyst might reside for an hour or more, is of substantial importance since temperature is so critical to the life of a catalyst. In the present apparatus, the low oxygen content gas in the upper zone cannot burn off all of the coke on the catalyst particles since some will remain at the center of the particle. This remainder, which might cause the total carbon content to be about 0.2% when leaving the upper zone, will be quickly burned off when the particles first enter the lower zone and are contacted by the high oxygen content gas therein. This burning will naturally cause the particles to be heated but, assuming the particles had their coke reduced to the desired level, will not produce temperatures any higher than those reached at the upper portion of the upper burn-off zone, and the temperature will soon fall to the level of the remainder of the lower zone. Also, since so little coke is present and since it takes a significant amount of time for the oxygen to diffuse into the center of the particles where the remaining coke resides, the slight short term increase in temperature will be of no substantial consequence.

BRIEF DESCRIPTION OF THE DRAWING

FIG. 1 is a partially sectioned, elevational view of a preferred form of catalyst reconditioning or regenerating apparatus in which a descending catalyst moves sequentially between an annular upper zone, an annular transition zone where it may be sampled, and a lower generally cylindrical zone;

FIG. 2 is an enlarged sectional view of a portion of the apparatus of FIG. 1 which illustrates the transition zone and its attachment to the upper and lower zones; and FIG. 3 is a cross-sectional view taken on line 3—3 of FIG. 2.

DETAILED DESCRIPTION OF THE DRAWINGS

Figures 1, 2, 3:
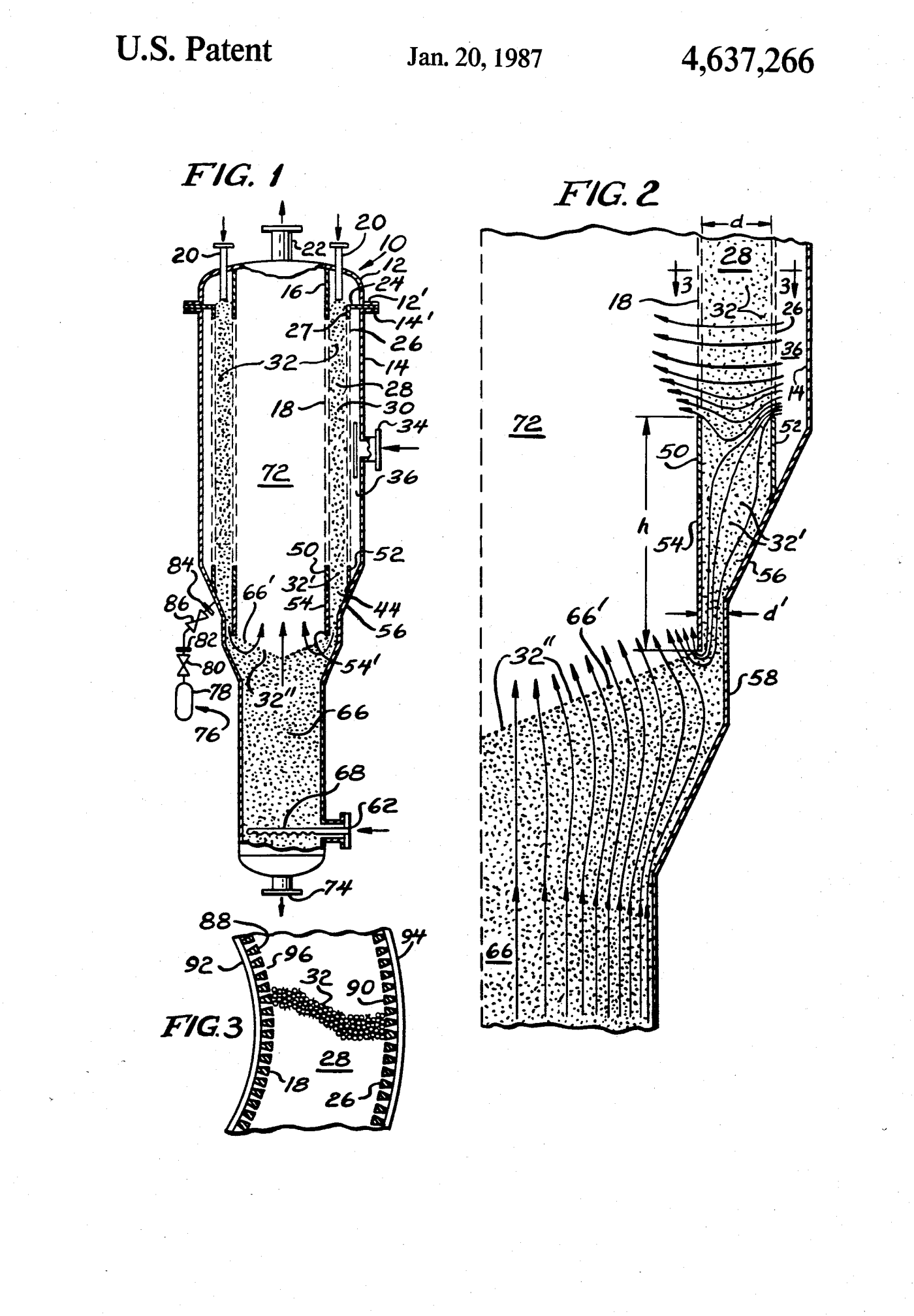

Referring to FIG. 1, a preferred embodiment of the apparatus of the present invention comprising a two-stage regenerator section, can be seen to include a vertical pressure vessel indicated generally at 10. A removable head section 12 is joined by fastener means, not shown, to the cylindrical outer wall 14 of the vessel. An unperforated end ring member 16 is welded at its upper end to the head section 12 and at its lower end to the upper end of a perforated inner screen cylinder 18. A plurality of catalyst inlet conduits 20 adapted to receive used catalyst from a reactor or other source, are mounted to, and pass through the head section 12. A gas outlet fitting 22 is also mounted to the head section to remove gases from inside the vessel. A radially extending screen support flange 24 is mounted between flanges 12', 14' on the head section 12 and wall 14 and serves to mount a perforated, outer screen cylinder 26 having an upper end mounting ring portion 27 which depends downwardly. The annular space between the inner and outer perforated screen portions 18, 26 defines an upper gas treatment zone 28 which contains a column 30 of used catalyst particles 32 having coke deposits thereon. Typically, the coke will be of such an extent as to cause carbon to amount to about 5 weight percent of the catalyst particles. The zone 28 may also be referred to as a "carbon burn-off" zone since, typically, the coke is substantially removed or burned off as the particles 32 are continually contacted by a stream of a first treatment gas which enters the zone 28 through the gas-vapor inlet means 34 and an annular distribution section 36 between wall 14 and screen 26. The first gas is preferably a recycle flue gas such as the gas exiting through outlet 22, to which a sufficient quantity of air has been added to give it a relatively low oxygen content, such as about 0.8%, for example. The low oxygen content holds down the rate of carbon burn-off and thus controls the maximum temperature to which the catalyst particles are subjected, thereby protecting them from being overheated. As previously discussed, the ability of the apparatus to permit accurate sampling, can permit adjustments to be made in the oxygen level to minimize temperatures and increase catalyst life.

Immediately below the upper "burn-off" zone 28 is a transition zone 44 defined at its upper end by an inner, unperforated cylindrical end ring member 50 which is welded to the bottom end of the inner perforated screen cylinder 18, and a similar end ring member 52 which is welded to the outer perforated screen cylinder 26. The lower end of the transition zone 44 is defined on its inner surface by a cylindrical inner wall portion 54 of a transition element which is welded to the ring member 50. Alternatively, the ring 50 could be longer so as to eliminate the need for element 54.

As seen most clearly in FIG. 2, the transition zone is shown as having a generally downwardly tapered cross-section since its outer wall is defined by an angled cone portion 56 and a vertical portion 58. Thus, at its top, the transition zone has a width equal to the width d of the radial space between the screens 18, 26, while at its bottom, it has a width d' which is preferably less than one half of d. Although the transition zone 44 could also have parallel side walls, and a constant width annular cross-section, the generally tapered design shown will, for a given height h of the transition zone, cause a decrease in the amount of the first gas which can pass downwardly through the transition zone as compared to a zone of constant width d. This flow decrease is caused by the increase in back pressure produced by the particles 32 in the catalyst bed when they must pass through a restricted opening. The provision of a tapered cross-section for the transition zone 44 also causes an increase in velocity of the particles in the column 30 as they pass downwardly through the transition zone. The downward movement of the particles is assisted by the fact that a small portion of the gas in the upper gas treatment section 36 will flow downwardly, as indicated by the streamlines in FIG. 2.

It will be readily obvious that the particles 32', which have completed their downward journey through the upper treatment zone 28 and passed into transition zone 44, will be truly representative of the degree of coke burn-off achieved in zone 28. This condition will exist since there is virtually no chance for the particles 32' therein to be contacted by the relatively oxygen-rich gas which enters gas inlet 62 and is distributed upwardly through the lower, cylindrical treatment zone 66 by a distribution means, such as a flow distributor 68. The gas flowing upwardly through the lower zone 66 will tend to flow directly into the central collection zone 72 wherein it will mix with the gases flowing radially inwardly through the upper treatment zone 28 and exit the apparatus through gas outlet 22. The central collection zone 72 will be at a pressure lower than the pressure of the gases entering inlets 34 and 62. Since the top surface 66' of the lower treatment zone 66 is defined only by the catalyst particles 32" which flow by gravity around the lower edge 54' of the inner wall 54 of the transition element, there would be no tendency for the upwardly flowing gas to flow into the transition zone 44. The flow cannot take place since the particles 32' in the transition zone would introduce a back pressure on the gas. Also, the small amount of downwardly flowing gas in the transition zone would be at a higher pressure than the pressure in the central collection zone 72.

The flow rate of the column 30 through the zone 28 and the zone 66 will be determined by the rate at which particles 32" leave the zone 66 through outlet 74. The particles leaving zone 66 can go on for additional treatment if desired, such as a drying operation, which forms no part of the present invention.

In order to sample the particles 32' in the transition zone 44, a sampling apparatus indicated generally at 76 can be utilized. The particular type of sampling apparatus used forms no part of the present invention but could comprise a sample bomb 78 having a valve 80 and joined by flange means 82 to an outlet port 84 having a flow control valve 86.

FIG. 3 is an enlarged sectional view taken on line 3—3 of FIG. 2 and merely illustrates the shape of the annular treatment zone 28, and the fact that the wedge-shaped wires 88, 90 which are welded to rods 92, 94 to form the screens 18, 26, respectively, have slots 96 which are of less dimension than the diameter of the catalyst particles 32.

The preceding description of the adaptation of the invention to a catalyst regenerator is merely representative of one application thereof and is not intended to limit the scope of the invention, which is defined by the claims hereinbelow.

I claim:

1. A method for obtaining a sample of particles from a system in which said particles move downward in a moving bed and are contacted successively by a first gas and a second gas, said sample being representative of particles which have been contacted with said first gas but which have not been contacted with said second gas, where the particles move through an upper zone in order to contact the first gas and move through a lower zone in order to contact the second gas, where said upper zone is comprised of a cylindrical upper portion of a vertical vessel having disposed within a pair of cylindrical, coaxial, radially-spaced screen elements known as an inner screen element and an outer screen element, where said screen elements confine the particles to form an annular bed of particles, where an annular gas distribution space is formed between the outer screen element and the side wall of said vessel, where the first gas flows radially inward from said gas distribution space through said annular bed and then flows upward within said inner screen member to exit from the upper zone, where the lower zone is comprised of a cylindrical lower portion of said vessel which is wholly filled with particles and of a smaller diameter than the upper portion of said vessel, and where the second gas flows upward through the particles in the lower zone and enters the upper zone, said method comprising: (a) passing particles leaving the upper zone into a transition zone, where said transition zone is an extension of said annular bed which is bounded by (i) a tapered portion of said vessel located between the upper zone and the lower zone, wherein the diameter of said tapered portion of said vessel is at a maximum at the top; (ii) a vertical cylindrical outer transition ring member of the same diameter as the outer screen element and attached thereto and coaxially disposed in the transition zone, where said outer transition ring member extends downward from the bottom of the outer screen element to said tapered side wall; and, (iii) a vertical cylindrical inner transition ring member of the same diameter as the inner screen element and attached thereto and coaxially disposed in the transition zone, where said inner transition ring member extends downward from the bottom of the inner screen element toward the tapered side wall and restricts the horizontal area for catalyst flow out of the annular bed into the lower zone; (b) passing a portion of said first gas from said annular gas distribution space into the top of the transition zone and downward out of the bottom of the transition zone into the lower zone; and, (c) removing said sample from the transition zone.

2. The sampling method of claim 1 wherein said second gas is prevented from entering said transition zone by a purge flow comprised of a small amount of said first gas which flows downward through said transition zone.

3. The sampling method of claim 1 wherein said inner transition ring member has a vertical height of at least twice the radial width of said annular bed.

4. The sampling method of claim 1 wherein said particles are hydrocarbon conversion catalyst particles.

5. The sampling method of claim 4 wherein said particles entering the upper zone carry an amount of coke equal to at least 2% by weight of the amount of particles.

6. The sampling method of claim 4 wherein said particles entering the transition zone carry an amount of coke equal to about 0.2% by weight of the amount of particles.

7. The sampling method of claim 4 wherein said first gas entering said upper zone contains at least 0.8% oxygen by volume.

8. The sampling method of claim 1 wherein said second gas entering said lower zone comprises air.

9. The sampling method of claim 1 wherein said second gas entering said lower zone comprises a chlorination agent.

* * * * *